(12) United States Patent
Chen et al.

(10) Patent No.: US 11,620,426 B2
(45) Date of Patent: Apr. 4, 2023

(54) AUTOMATED SYSTEM AND METHOD FOR CIRCUIT DESIGN

(71) Applicant: Taiwan Semiconductor Manufacturing Company, Ltd., Hsinchu (TW)

(72) Inventors: Shin-Chi Chen, Hsinchu (TW); King-Ho Tam, Hsinchu (TW); Yu-Ze Lin, Hsinchu (TW); Huang-Yu Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 47 days.

(21) Appl. No.: 17/331,825

(22) Filed: May 27, 2021

(65) Prior Publication Data

US 2022/0382946 A1    Dec. 1, 2022

(51) Int. Cl.
     *G06F 30/30*      (2020.01)
     *G06F 30/392*      (2020.01)
     *G06F 30/327*      (2020.01)
     *G06F 30/31*      (2020.01)
     *G06F 119/18*      (2020.01)

(52) U.S. Cl.
     CPC ............ *G06F 30/392* (2020.01); *G06F 30/31* (2020.01); *G06F 30/327* (2020.01); *G06F 2119/18* (2020.01)

(58) Field of Classification Search
None
See application file for complete search history.

(56) References Cited

U.S. PATENT DOCUMENTS

| | | | |
|---|---|---|---|
| 10,445,457 B1 * | 10/2019 | Loo | G06F 30/367 |
| 10,902,173 B2 * | 1/2021 | Kim | G06F 30/20 |
| 2022/0012392 A1 * | 1/2022 | Huang | G06F 8/41 |

OTHER PUBLICATIONS

P. I. Frazier, "A Tutorial on Bayesian Optimization," arXiv:1807.02811v1, [stat.ML], Jul. 8, 2018, pp. 1-22. (Year: 2018).*

* cited by examiner

*Primary Examiner* — Leigh M Garbowski
(74) *Attorney, Agent, or Firm* — Merchant & Gould P.C.

(57) ABSTRACT

A method in certain embodiments includes using a computer system that includes an EDA tool to generate a layout of an IC device; searching, using a statistical method such as Bayesian optimization process, for one or more input variable parameters, such as the dimensions of the IC device and the dimensions of the voltage areas in the IC device, that results in an optimal characteristic, such as power, performance or area (PPA) of the IC device. A computer system including one or more EDAs configured to perform the method is also disclosed.

20 Claims, 9 Drawing Sheets

AUTOMATED SYSTEM AND METHOD FOR CIRCUIT DESIGN

BACKGROUND

This disclosure relates generally to electronic design automation and more particularly to methods and systems for automated optimization of layout in integrated circuit design.

Integrated circuits (ICs) are being designed and manufactured at increasingly high degree of complexity and high device densities. Optimization of designs for various considerations, such as power, performance, and area (PPA) is becoming an increasingly difficult and time- and resource-consuming task. Manual optimization processes often can only explore limited variations in design parameters, primarily based on designers' intuition and/or experience, and fail to discover more optimal designs. Efforts in increasing efficiency and effectiveness of design optimization are ongoing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
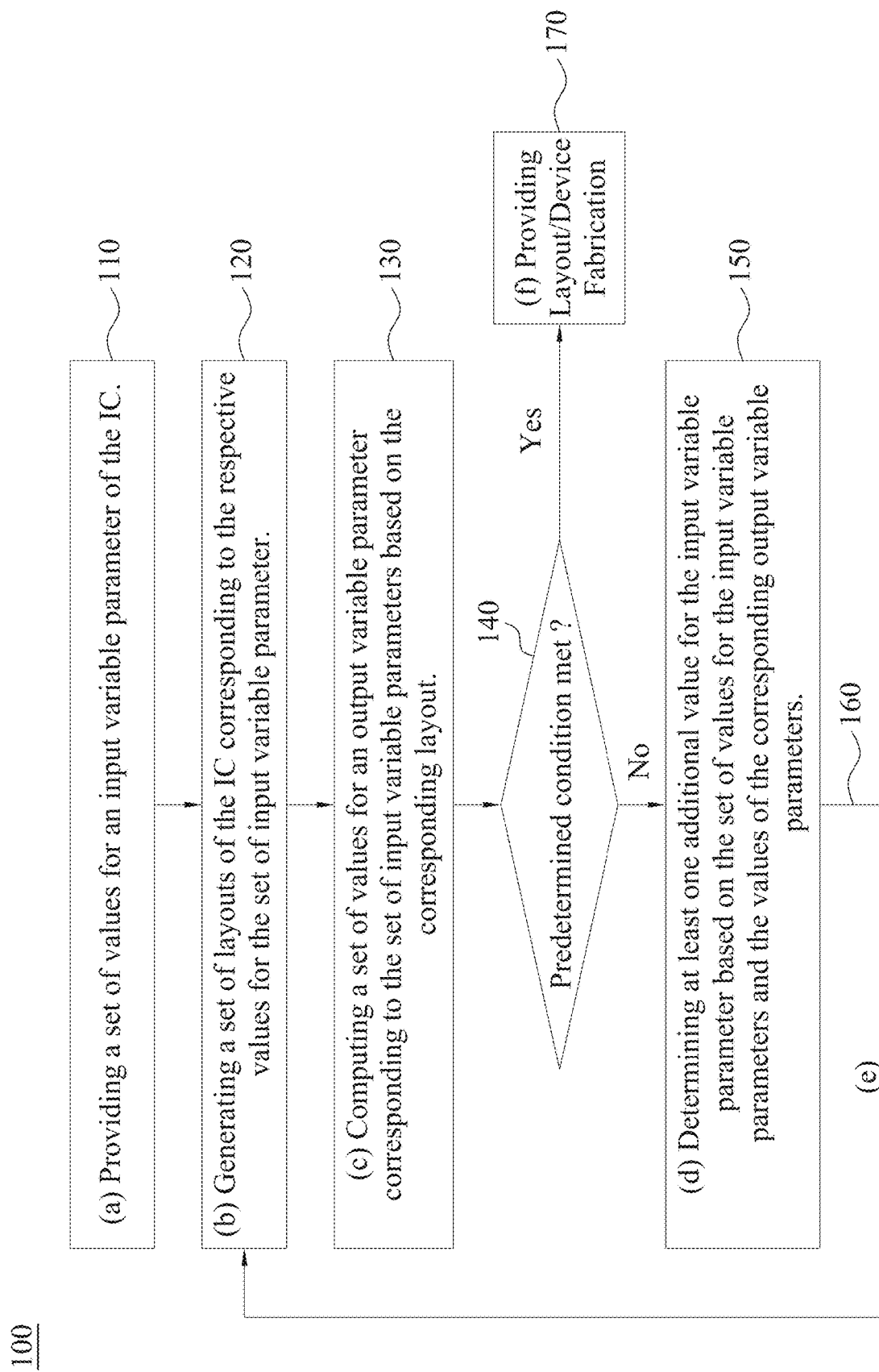
FIG. 1 outlines a method for design optimization in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Integrated circuits (ICs) are being designed and manufactured at increasingly high degree of complexity and high device densities. Optimization of designs for various considerations, such as power, performance, and area (PPA) is becoming an increasingly difficult and time- and resource-consuming task. For example, for a RISC-V processor with two voltage areas (VAs), to optimize the floor plan (FP) for utilization (percentage of area utilized by cells), the vertical and horizontal dimensions (Vs and Hs, respectively) of the VAs and of the overall processor (totaling six dimensions) may be varied. To optimize using the grid method, i.e., to try all permutations of Vs and Hs, $n^6$ trials need to be conducted, where n is the number of lengths to be tried for each dimension. Thus, for example, 64 million trials would be needed for 20 different lengths in each dimension; 262 thousand trials for 8 different lengths; and four thousand trials for four (4) different lengths. Manual optimization processes often can only explore limited variations in design parameters, primarily based on designers' intuition and/or experience, and fail to discover more optimal designs. Certain methods and systems disclose in this disclosure can provide increased efficiency and effectiveness of design optimization as compared with traditional methods and systems.

In some embodiments, as shown in FIG. 1, a computer-implemented method 100 for optimizing a physical layout of an integrated circuit (IC) includes (a) 110 providing a set of values for an input variable parameter of the IC; (b) 120 generating a set of layouts of the IC corresponding to the respective values for the set of input variable parameter; (c) 130 computing a set of values for an output variable parameter corresponding to the set of input variable parameters based on the corresponding layout; (d) if 140 a predetermined condition on is not met, 150 determining at least one additional value for the input variable parameter based on the set of values for the input variable parameters and the values of the corresponding output variable parameters; and (e) 160 repeating steps (b) through (d), with the additional value for the input variable parameter included in the set of input values. In some embodiments, as discussed in more detail below, the determination of the at least one additional value for the input variable parameter (step (d)) is done using a statistical optimization process such as Bayesian optimization process. In some embodiments, the value for the input addition variable input parameter is dependent on both (a) proximity to at least one of the values for the set of input variable parameters and (b) uncertainty in the computed value for the output variable parameter at the value for the input variable parameter. In some embodiments, the computer-implemented method further includes (f) providing a physical layout of the IC and/or fabricating the IC according to one of the layouts generated in step (b) for which layout the predetermined condition is met.

In some embodiments, the output variable parameter is one or more of the so-called PPA, i.e., power, performance and area, where power is related to the power consumption of the device, performance is related to the frequency at which the device is capable of operating, and area is related to the utilization.

The processes described above and below are implemented by a computer system, such as a computer system having electronic design automation (EDA) tools for automated placement and routing of devices in some embodiments. Examples of EDA tools include those for automated cell placement and routing, such as Design Compiler Graphical and Fusion Compiler by Synopsys, Inc., and Innovus by Cadence Design Systems, Inc. Such a computer system in some embodiment includes one or more special-purpose computers, which can be one or more general-purpose computers specifically programmed to perform the methods. For example, a computer 200 schematically shown in FIG. 2 can be used. The computer 200 includes a processor 210, which is connected to the other components of the computer via a data communication path such as a bus 220. The components include system memory 230, which is loaded with the instructions for the processor 210 to perform the methods described above. Included is also a mass storage device, which is a computer-readable storage medium 240. The mass storage device is an electronic, magnetic, optical, electromagnetic, infrared, and/or a semiconductor system (or apparatus or device). For example, the computer-readable storage medium 240 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer-readable storage medium 240 includes a compact disk-read only memory (CD-ROM), a compact disk-read/write (CD-R/W), and/or a digital video disc (DVD). The mass storage device 240 stores, among other things, the operating system 242; programs 244, including those that, when read into the system memory 220 and executed by the processor 210, cause the computer 200 to carry out the processes described above; and Data 246. Data 246 can include, for example, a standard cell library, which includes standard cells, such as NAND, NOR, INV (inverter), AOI (AND-OR-Inverter), and SDFQ (D flip-flop with scan input), design rules, status of the IC circuit design, including the current iteration of mask pattern. The computer 200 also includes an I/O controller 250, which input and output to a User Interface 252. The User Interface 252 can include a keyboard, mouse, display and any other suitable user interfacing devices. The I/O controller can have further input/out ports for input from, and/or output to, devices such as an External Storage device 280, which can be any memory device, including a semiconductor or solid-state memory device, a magnetic tape drive, a rigid magnetic disk drive, and/or an optical disk, such as a compact disk-read only memory (CD-ROM), a compact disk-read/write (CD-R/W), and/or a digital video disc (DVD). The computer can further include a network interface 260 to enable the computer to receive and transmit data from and to remote networks 262.

The computer system in some embodiments includes a Fabrication Tools module 270 for layout and physical implementation of the device fabrication as designed at least in part using the processes described above. The Fabrication Tools module 270 in some embodiments is a part of the computer 200 and is connected to the bus 220 and can receive the layout design stored in the Mass Storage device 240. In other embodiments, the Fabrication Tools module can be a system separate from the computer 200 but receive the layout design made by the computer 200 via the Network 262. In still further embodiments, the Fabrication Tools module can be a system separate from the computer 200 but receive the layout design made by the computer 200 from a External Storage device 280, such as a solid state storage device or an optical disk.

As noted above, the computer system, such as an EDA system (i.e., a computer system with EDA tools) in some embodiments includes fabrication tools 270 for implementing the processes and/or methods stored in the storage medium 240. For instance, a synthesis ay be performed on a design in which the behavior and/or functions desired from the design are transformed to a functionally equivalent logic gate-level circuit description by matching the design to standard cells selected from the standard cell library 248. The synthesis results in a functionally equivalent logic gate-level circuit description, such as a gate-level netlist. Based on the gate-level netlist, a photolithographic mask may be generated that is used to fabricate the integrated circuit by the fabrication tools 270. Further aspects of device fabrication are disclosed in conjunction with FIG. 3, which is a block diagram of IC manufacturing system 301, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using the manufacturing system 301.

Figure 3:
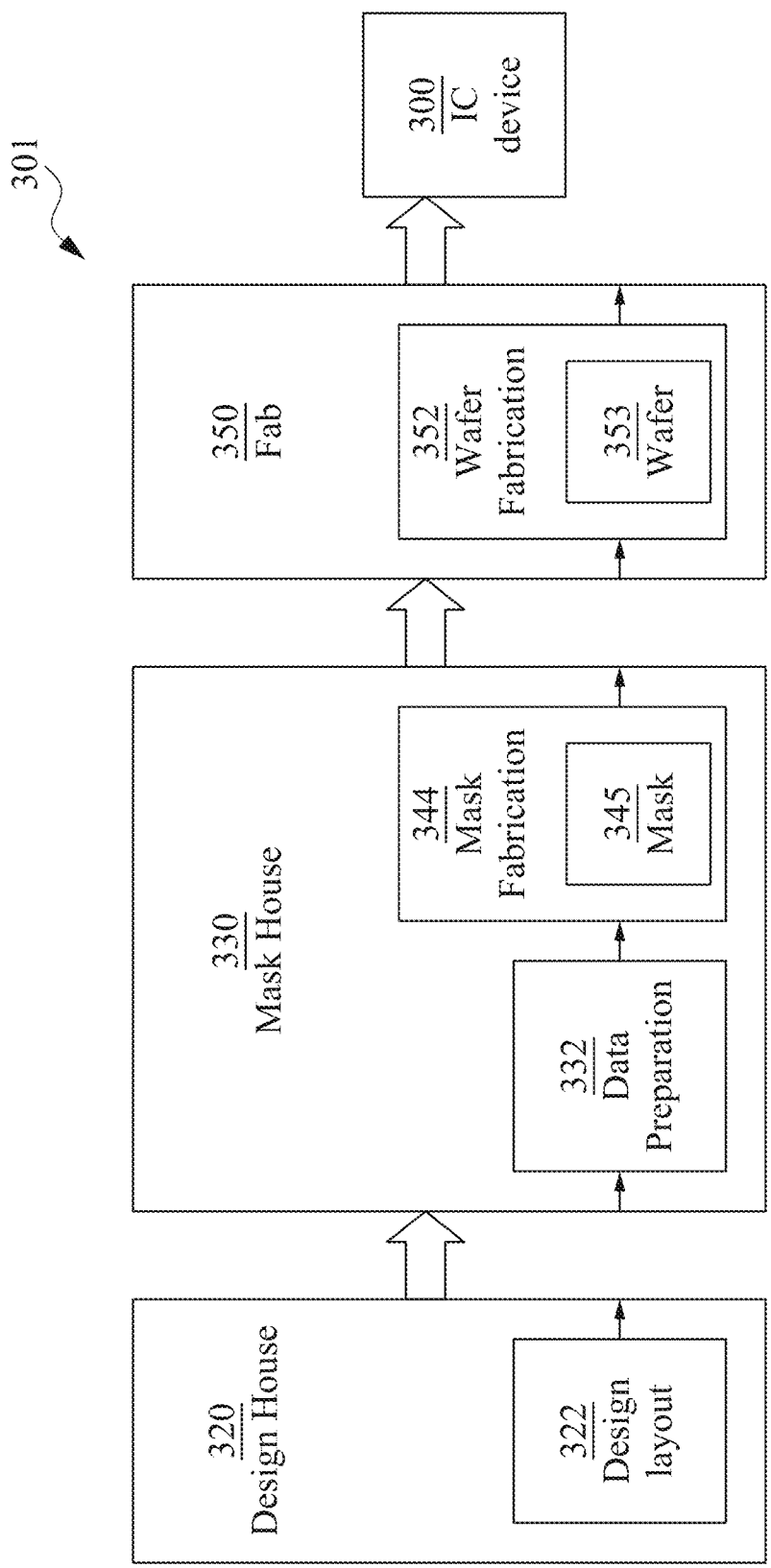
FIG. 3 shows a block diagram of an IC manufacturing system and an IC manufacturing flow associated therewith in accordance with some embodiments.

In FIG. 3, the IC manufacturing system 301 includes entities, such as a design house 320, a mask house 330, and an IC manufacturer/fabricator ("fab") 350, that interact with one another in the design, development, and manufacturing cycles and/or services related to manufacturing an integrated circuit (IC) 300, such as the devices disclosed herein. The entities in the system 301 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of the design house 320, mask house 330, and IC fab 350 is owned by a single entity. In some embodiments, two or more of design house 320, mask house 330, and IC fab 350 coexist in a common facility and use common resources.

The design house (or design team) 320 generates an IC design layout diagram 322. The IC design layout diagram 322 includes various geometrical patterns, or IC layout diagrams designed for an IC device, such as the IC 300 discussed above. The geometrical patterns correspond to patterns of metal, oxide, or semiconductor layers that make up the various components of the IC 300 to be fabricated. The various layers combine to form various IC features. For example, a portion of the IC design layout diagram 322 includes various IC features, such as an active region, gate electrode, source and drain, metal lines or local vias, and openings for bonding pads, to be formed in a semiconductor substrate (such as a silicon wafer) and various material layers disposed on the semiconductor substrate. The design house 320 implements a design procedure to form an IC design layout diagram 322. The design procedure includes one or more of logic design, physical design or place and route. The IC design layout diagram 322 is presented in one or more data files having information of the geometrical patterns. For example, IC design layout diagram 322 can be expressed in a GDSII file format or DFII file format.

The mask house 330 includes a data preparation 332 and a mask fabrication 344. The mask house 330 uses the IC design layout diagram 322 to manufacture one or more masks 345 to be used for fabricating the various layers of the IC 300 according to the IC design layout diagram 322. The mask house 330 performs mask data preparation 332, where the IC design layout diagram 322 is translated into a representative data file ("RDF"). The mask data preparation 332 provides the RDF to the mask fabrication 344. The mask fabrication 344 includes a mask writer. A mask writer converts the RDF to an image on a substrate, such as a mask (reticle) 345 or a semiconductor wafer 353. The design layout diagram 322 is manipulated by the mask data preparation 332 to comply with particular characteristics of the mask writer and/or requirements of the IC fab 350. In FIG. 3, the mask data preparation 332 and the mask fabrication 344 are illustrated as separate elements. In some embodiments, the mask data preparation 332 and the mask fabrication 344 can be collectively referred to as a mask data preparation.

In some embodiments, the mask data preparation 332 includes an optical proximity correction (OPC) which uses lithography enhancement techniques to compensate for image errors, such as those that can arise from diffraction, interference, other process effects and the like. The OPC adjusts the IC design layout diagram 322. In some embodiments, the mask data preparation 332 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, the mask data preparation 332 includes a mask rule checker (MRC) that checks the IC design layout diagram 322 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 322 to compensate for limitations during the mask fabrication 344, which may undo part of the modifications performed by OPC in order to meet mask creation rules.

In some embodiments, the mask data preparation 332 includes lithography process checking (LPC) that simulates processing that will be implemented by the IC fab 350 to fabricate the IC 300. LPC simulates this processing based on the IC design layout diagram 322 to create a simulated manufactured device, such as the IC 300. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine the IC design layout diagram 322.

It should be understood that the above description of mask data preparation 332 has been simplified for the purposes of clarity. In some embodiments, data preparation 332 includes additional features such as a logic operation (LOP) to modify the IC design layout diagram 322 according to manufacturing rules. Additionally, the processes applied to the IC design layout diagram 322 during data preparation 332 may be executed in a variety of different orders.

After the mask data preparation 332 and during the mask fabrication 344, a mask 345 or a group of masks 345 are fabricated based on the modified IC design layout diagram 322. In some embodiments, the mask fabrication 344 includes performing one or more lithographic exposures based on the IC design layout diagram 322. In some embodiments, an electron-beam (e-beam) or a mechanism of multiple e-beams is used to form a pattern on a mask (photomask or reticle) 345 based on the modified IC design layout diagram 322. The mask 345 can be formed in various technologies. In some embodiments, the mask 345 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of the mask 345 includes a transparent substrate (e.g., fused quartz) and an opaque material (e.g., chromium) coated in the opaque regions of the binary mask. In another example, the mask 345 is formed using a phase shift technology. In a phase shift mask (PSM) version of the mask 345, various features in the pattern formed on the phase shift mask are configured to have proper phase difference to enhance the resolution and imaging quality. In various examples, the phase shift mask can be attenuated PSM or alternating PSM. The mask(s) generated by the mask fabrication 344 is used in a variety of processes. For example, such a mask(s) is used in an ion implantation process to form various doped regions in the semiconductor wafer 353, in an etching process to form various etching regions in the semiconductor wafer 353, and/or in other suitable processes.

The IC fab 350 includes wafer fabrication 352. The IC fab 350 is an IC fabrication business that includes one or more manufacturing facilities for the fabrication of a variety of different IC products. In some embodiments, the IC Fab 350 is a semiconductor foundry. For example, there may be a manufacturing facility for the front end fabrication of a plurality of IC products (FEOL fabrication), while a second manufacturing facility may provide the back end fabrication for the interconnection and packaging of the IC products (BEOL fabrication), and a third manufacturing facility may provide other services for the foundry business.

The IC fab 350 uses mask(s) 345 fabricated by the mask house 330 to fabricate the IC 300. Thus, the IC fab 350 at least indirectly uses the IC design layout diagram 322 to fabricate the IC 300. In some embodiments, the semiconductor wafer 353 is fabricated by the IC fab 350 using mask(s) 345 to form the IC 300. In some embodiments, the IC fabrication includes performing one or more lithographic exposures based at least indirectly on the IC design layout diagram 322. The Semiconductor wafer 353 includes a silicon substrate or other proper substrate having material layers formed thereon. The semiconductor wafer 353 further includes one or more of various doped regions, dielectric features, multilevel interconnects, and the like (formed at subsequent manufacturing steps).

Figure 2:
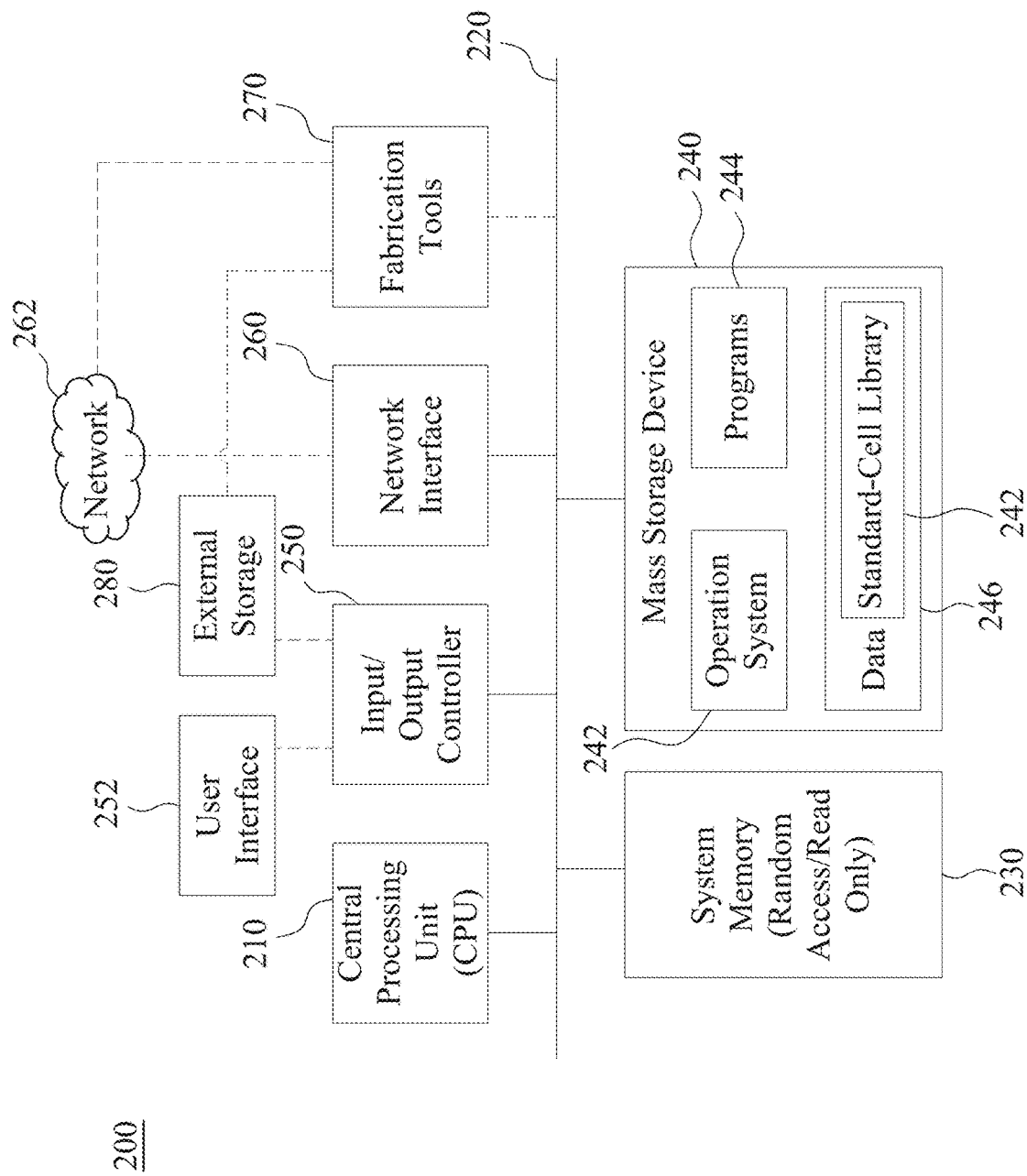
FIG. 2 shows a block diagram illustrating an example of a computer system in accordance with some embodiments.
Figure 4:
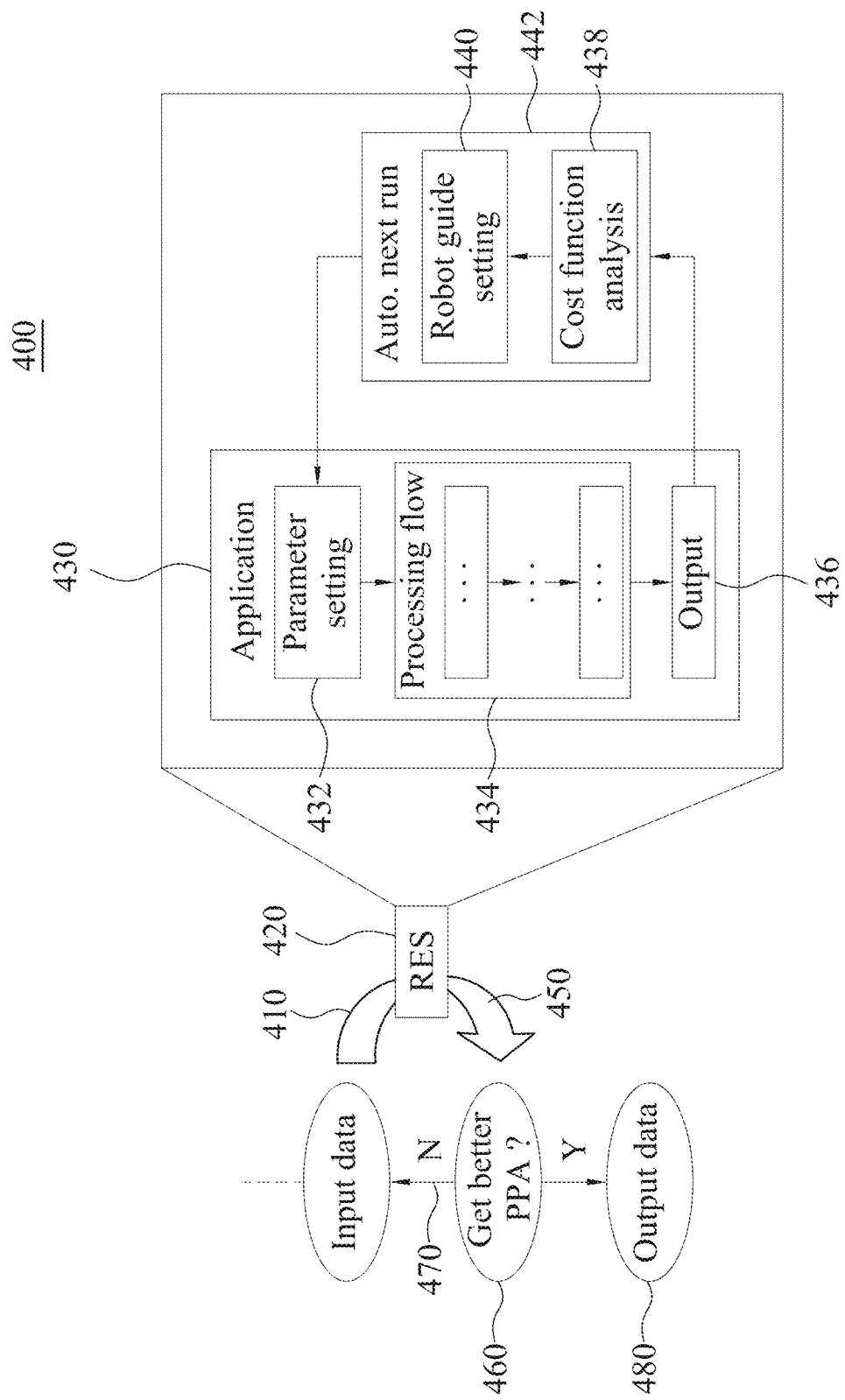
FIG. 4 shows an IC optimization process in accordance with some embodiments.

Referring to FIG. 4, in some embodiments, a process 400 for generating an IC layout and/or IC fabrication includes providing 410 input data, which can be a set of values of an input variable parameter, such as vertical and/or horizontal dimensions of VAs and/or of the overall device, such as an RISC-V processor, to a robot expert system (RES) 420, which can be a computer 200 in FIG. 2. Within an RES 420, an application 430, such as an EDA tool, runs. The application 430 sets 432 one or more input variable parameters. In the next step 434, various steps of physical design of the IC are carried out, where the input variable parameters are processed to generate a set of respective layouts and one or more output variable parameters, such as one or more of PPA and/or clock-tree-synthesis (CTS) overflow, are computed. The values of the input variable parameters and corresponding output variable parameters are also used to compute one or more additional values of the input variable parameters using an optimization process such as Bayesian optimization process, and a corresponding additional layout is generated and its output variable parameter computed. In some embodiments, some or all of the results of such computations are used 436 to perform a cost function analysis 438, discussed in more detail below, in which the benefit, such as increased utilization, is evaluated against cost, such as increased CTS overflow. The result of the cost function analysis is used in a robot guide setting step 440 to adjust, or constrain, the input variable parameters for the next iteration of running the application 430. Next, the application 430 is automatically repeated 442 for the modified input variable parameters. The process described above is automatically repeated until certain conditions are met, such as when an output variable parameter to be optimized, such as utilization, substantially remains unchanged (converges), or a certain number of iterations of the process has been completed, the output variable parameter or parameters are output 450 from the RES 420 and compared 460 with those for the layouts corresponding to the original input data. If the RES has produced output variable parameters, such PPA, that are not as desirable as the most desirable output variable parameters of the original layouts, the modified input variable parameters are used 470 in the next iteration of the process by the RES 420 as described above; otherwise the layout generated in the final iteration is output 480 to obtain a physical layout files in formats (e.g., GDSII and DRC) that can be read by IC fabricator 350 (FIG. 3) to produce the IC devices.

Figure 5A:
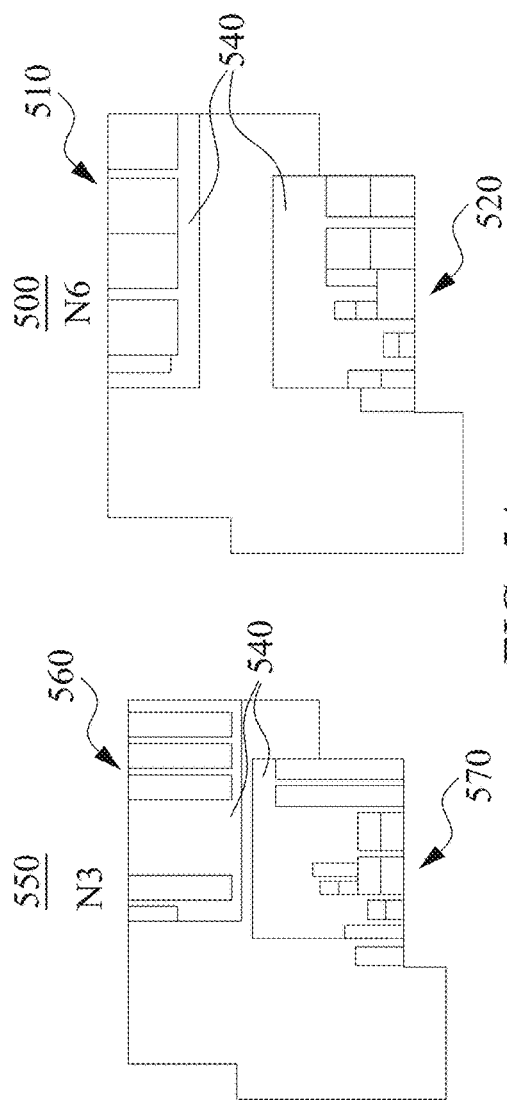
FIG. 5A shows the result of an initial step in an optimization process in accordance with some embodiments.

In some embodiments, as illustrated in FIG. 5A, the initial layout for the optimization process, such as that provided by step (a) 110 of the process 100 (FIG. 1), is provided by migrating from a previously known layout. For example, the layout for a 3-nm device 550 with a certain number of VAs 560,570 can be initially generated, migrated, from a layout for a 6-nm device 500 having the same number of VAs 510,520 based on known scaling factors. That is, the cells 540 in the 6-nm device can be scaled to different sized and/or aspect ratios to those 540 in the 3-nm device.

Figure 5B:
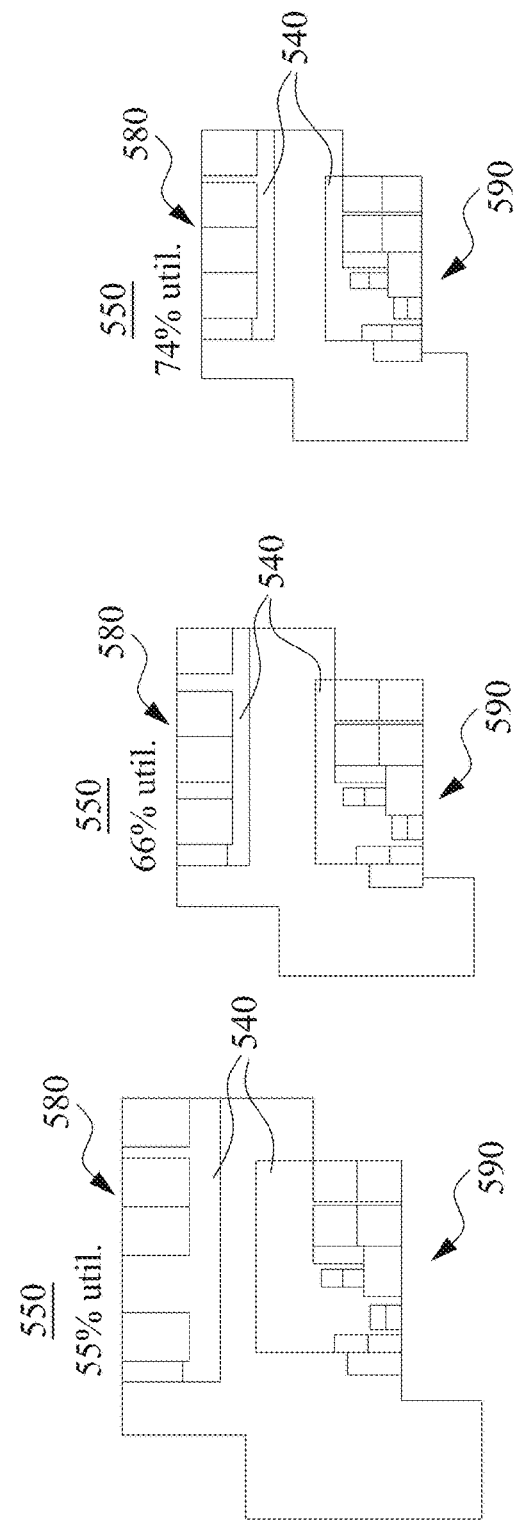
FIG. 5B shows the results of certain subsequent steps in an optimization process in accordance with some embodiments.

Next as shown in FIG. 5B, an optimization process described above is used to generate layouts that have progressively higher utilization, from 55% to 66%, and to 74% in the examples given.

Figure 6:
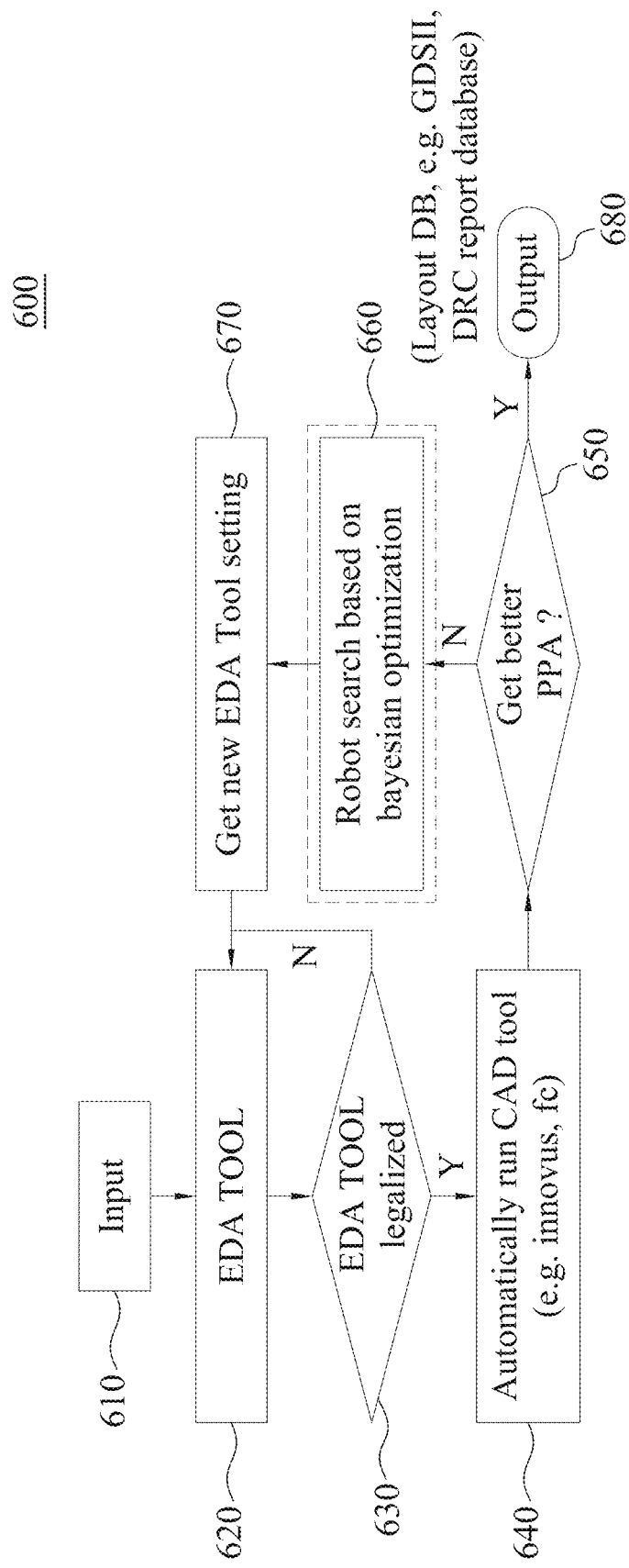
FIG. 6 shows a process flow for optimizing IC design in accordance with some embodiments.

In some embodiments, such as the one illustrated in FIG. 6, PPA optimization by varying input variable parameters, such as Hs and Vs of respective VAs and overall device can be achieved by a process 600, which begin with providing 620 inputs 610 to an EDA tool. If the EDA tool is determined 630 to be not legalized (i.e., input floor plan is valid (e.g., no overlapping memory macros)) the process 600 reverts to step 620 until a legal configuration is found; otherwise the EDA tool generates 640 layouts based the inputs and computes one or more PPA parameters, such as utilization. The PPA parameters are compared 650 with the initial PPA parameter in the first iteration of the optimization process 600, or best PPA parameter in the previous iteration in the subsequent iterations. If the PPA parameter is not better, an optimization process, such as Bayesian optimization process as described above is run 660 to search for a better PPA parameter by adding one or more new inputs to be supplied to the EDA tool. The new inputs are then supplied 670 to the EDA tool and the process is repeated until a more desirable PPA parameter is found, and the corresponding layout is output 680 to a layout database, to be used for fabricating the IC device.

Figure 7:
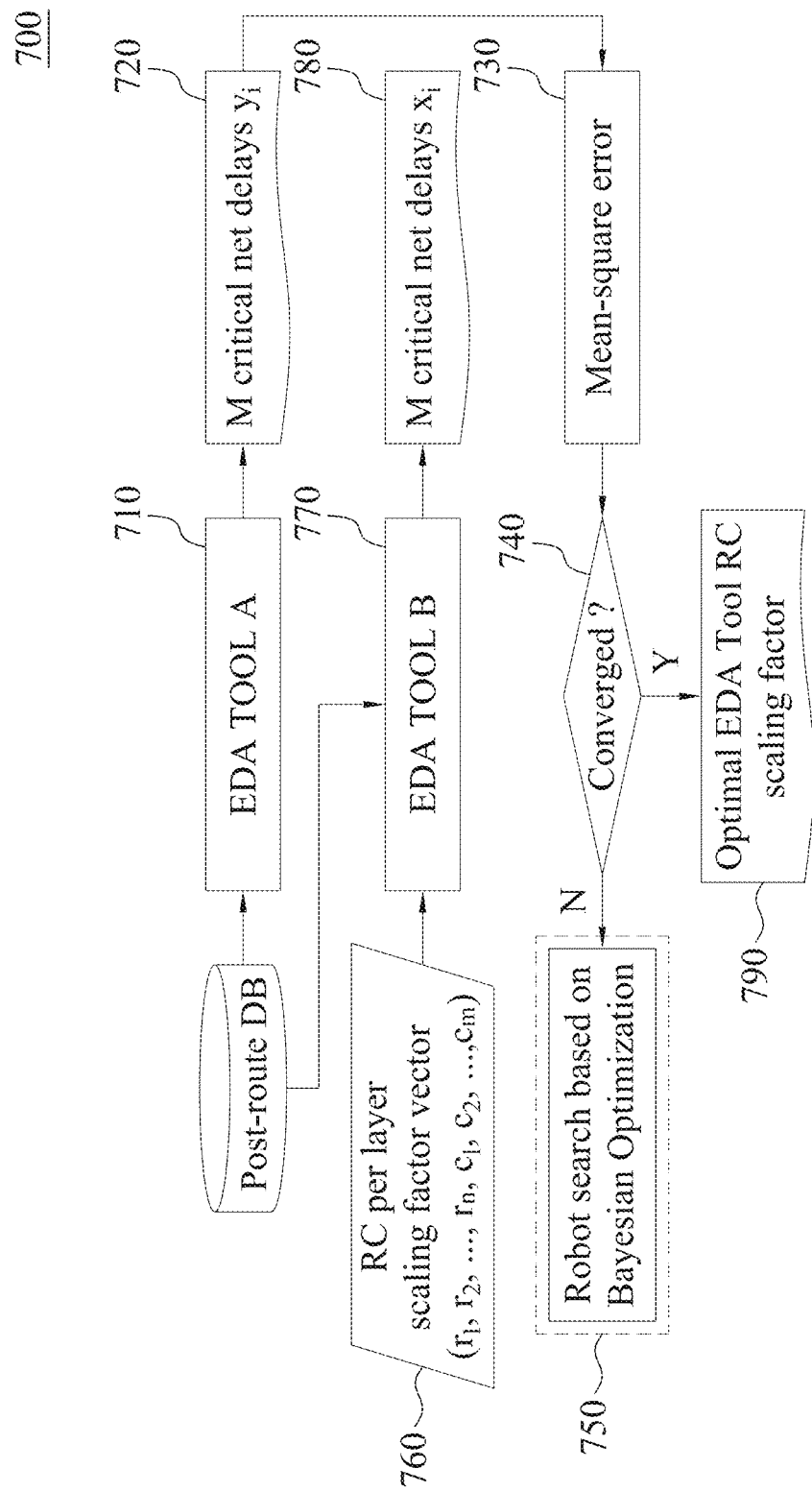
FIG. 7 shows a process flow for optimizing IC design in accordance with some embodiments.

In certain other embodiments, such as the one illustrated in FIG. 7, an optimization process 700 can be used to provide improved accuracy of certain electrical characteristics (such as RC time delay per IC layer) estimated by EDA tools and thus leads to improved performance (such as timing) of IC devices designed with the aid of the EDA tools. In this example, an existing layout for an IC device is provided from a post-route database is provided 710 to a first EDA tool (EDA Tool A), which can be an automatic placement-and-routing (APR) tool and/or a combination of an RC extraction too (RCXT) and static timing analysis (STA) tool. The first EDA tool computes 720 a first set of values for a performance parameter, such as critical net (or interconnect) delays for each layer based on the layout from the post-route database. The existing layout for an IC device is also provided 770 from the post-route database is provided 710 to a second EDA tool (EDA Tool B), which can be a logic synthesis tool, which generates, for example, netlists that can be subsequently used by an APR tool to generate physical layouts. The second EDA tool in this example is also configured to compute 780 a second set of values of the performance parameter, such as net delays for each layer from the RC data received. The net delays computed by the two EDA tools are compared 730, for example by computing a mean-squared error, and a determination is made 740 based on the comparison (e.g., the size of the mean-squared error) as to whether the net delays provided by the EDA tools have converged. If the net delays are deemed to have not converged (e.g., if the mean-squared error is larger than a predetermined value), a robot search (750) is performed by providing (760) resistance and capacitance values or scaling factors to the second EDA tool, which in turn recomputes the second set of net delays, which is again comparted with the first set of net delays, and so on. The cycle repeats, with additional RC values or scaling factors added 760 each time by the robot search process 750. The process by which the RC data are added in some embodiments is similar the optimization process outlined in FIG. 1. The search process ends 790 when the mean-square error is smaller than certain predetermined level. The RC data can then be used by a logic synthesis EDA tool to generate gate-level netlist for physical layouts by an APR EDA tool. Because the pre-route (logic synthesis stage) RC parameters are matched to post-route RC parameters by the optimization process, the IC devices designed by the optimization process are more likely to have improved timing performance.

Figure 8:
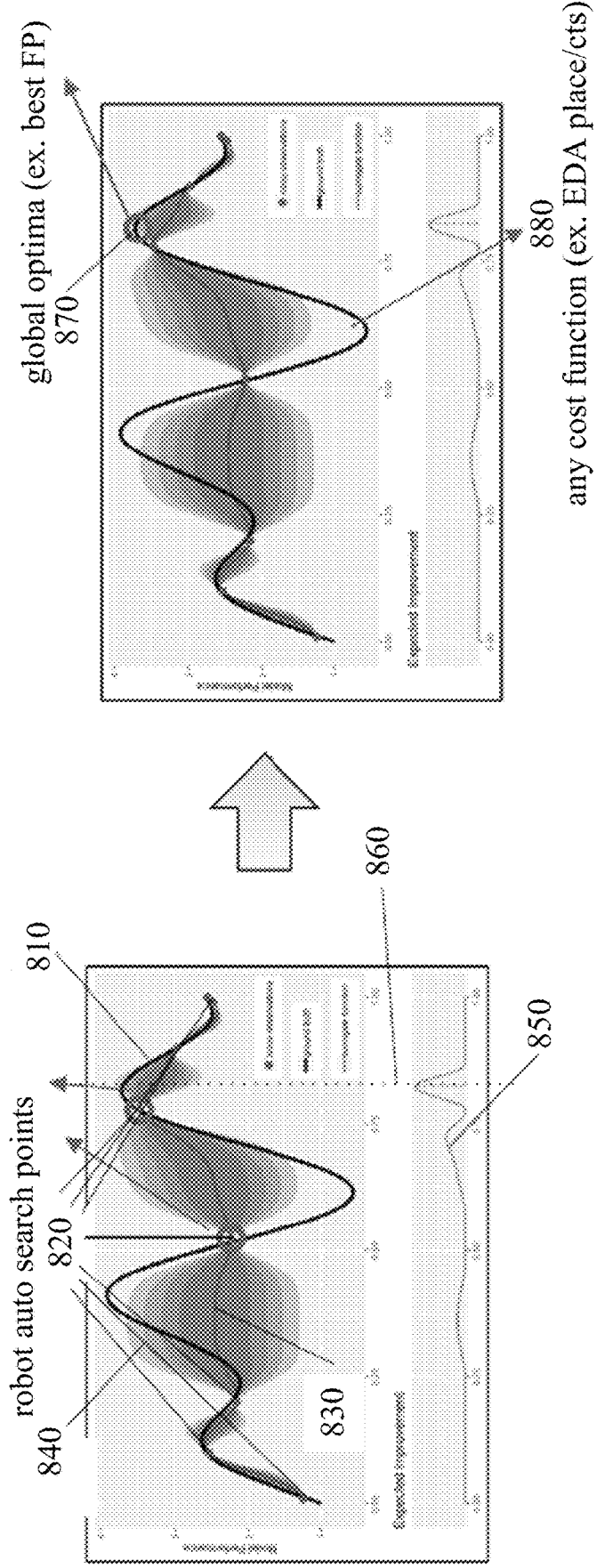
FIG. 8 illustrates a Bayesian optimization used in certain processes for optimizing IC design in accordance with some embodiments.

In some embodiments, the robot search process includes a Bayesian optimization process. In a Bayesian optimization process, as illustrated in FIG. 8, the search for a global maximum (or minimum) of an unknown function (or ground truth) 810 (such as utilization verses V and H) is carried out first by evaluating (testing) the function 810 at a set of test values (such as initial Vs and Hs) to obtain the corresponding set of test points 820 that satisfy the function 810. Next, a statistical process, such as Gaussian Process (GP) is used to generate a surrogate function 830 that pass through those points 820 with a range of uncertainty 840 depending on the distance from the test points 820 (greater uncertainty at greater distances from the test points). Next, an acquisition function 850 is generated that guides where to test the function 810 next. An acquisition function is generated by combining the benefit of searching in points away from previously tested points (exploration) and that of searching near the current maxima (or minima) (exploitation of currently known maxima (or minima)). A variety of algorithms, including the "expected improvement" algorithm, can be used to generate the acquisition function 850. The maximum point (represented by the dotted line 860 in FIG. 8) of the acquisition function 850 is then used to produce the new test point 870. The process can be repeated with the new set of test points 820, now including test point 870, to find the additional test points. The process can end when certain predetermined condition(s) is (are) met. For example, one condition can be that the process of identifying a new test point has gone through a certain number of iterations; another condition can be that a test point has been found to have a value of the function 810 greater than a threshold level. A description of Bayesian optimization process can be found in, for example, P. L. Frazier, "A Tutorial on Bayesian Optimization," arXiv:1807.02811v1 [stat.ML], which incorporated herein by reference.

In some embodiments, the optimization processes described above are guided, or constrained by factors, or variables, not tested by a particular algorithm (e.g., Bayesian) used. For example, maximizing utilization may incur the cost of overflow, i.e., move routing demands than routing resources, and utilization should be reduced by an amount corresponding to the overflow. Such constraints can be taken into account in a cost function analysis (step 438 in FIG. 4) by using a cost (or barrier) function 880 to guide the search. In some embodiments, the cost function can take the form:

$$\text{Utilization} - (e^{\alpha \cdot \text{overflow}_H + \beta} - \gamma) - (e^{\alpha \cdot \text{overflow}_V + \beta} - \gamma) \quad (1)$$

where $\text{overflow}_H$ is the overflow in the horizontal direction, $\text{overflow}_V$ is the overflow in the vertical direction, and $\alpha$, $\beta$, and $\gamma$ are constants. Cost function (1) is an expression that utilization should be reduced by an amount $$(e^{\alpha \cdot \text{overflow}_H + \beta} - \gamma) + (e^{\alpha \cdot \text{overflow}_V + \beta} - \gamma) \quad (2)$$

The constants $\alpha$, $\beta$, and $\gamma$ are in some embodiments determined by experience of the IC designers. For example, a set of conditions can be:

For overflow (H or V)=0, reduction in utilization=0;
For overflow (H or V)=5, reduction in utilization=1;
For overflow (H or V)=20, reduction in utilization=2;

Solving the equations $(e^{\alpha \cdot \text{overflow}_H + \beta} - \gamma) = 0, 5,$ and $20$, one obtains $\alpha \approx 1.1$, $\beta \approx 0.9$, and $\gamma = 2.5$. That is, utilization should not exceed $$\text{Utilization} - (e^{1.1 \cdot \text{overflow}_H + 0.9} - 2.5) - (e^{1.1 \cdot \text{overflow}_V + 0.9} - 2.5) \quad (3)$$

Figure 9A:
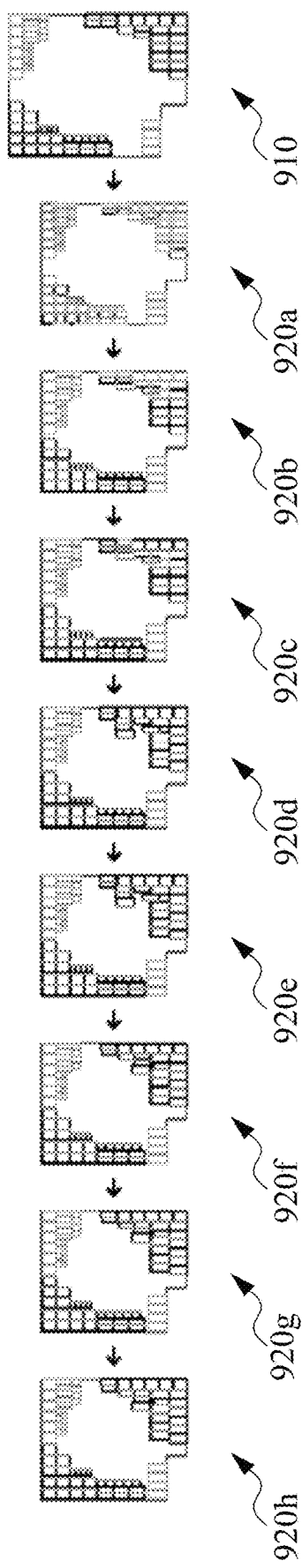
FIG. 9A shows an example series of floor plans as results of successive iterations of a process for optimizing IC design in accordance with some embodiments.
Figure 9B:
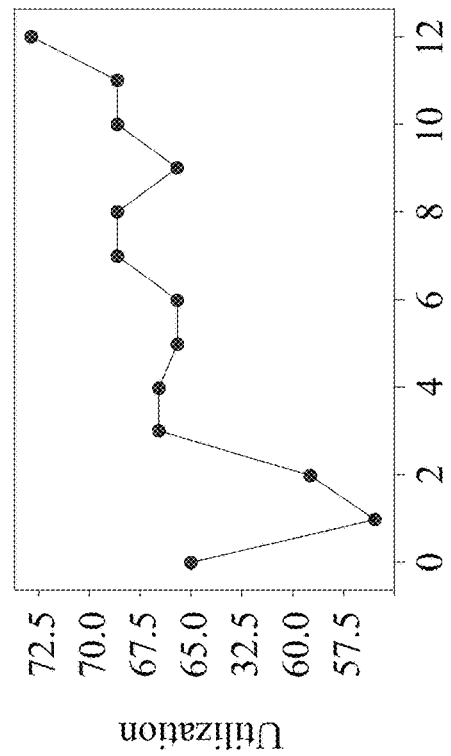
FIG. 9B shows an example progression of utilization as a result of successive iterations of a process for optimizing IC design in accordance with some embodiments.

With the optimization processes described above, the optimization efficiency can be greatly improved over traditional method of manual trial-and-error, or grid search. FIG. 9A shows an example sequence of layouts generated by a Bayesian optimization process. A layout of a larger device 910 is first scaled down to a smaller device 920a. A Bayesian optimization process is then carried out to optimize utilization to generate iterative layouts 920b through 920h. As shown in FIG. 9B, utilization improved in one example from about 65% to about 73% in twelve iterations. Tables I and II below show examples of utilization improvements for certain processors.

TABLE I

Robot auto search: N5 GPU, 5% utilization improvement with overflow ≤ 1.2%

| Case | Iteration | Score | Utilization | Overflow$_H$ | Overflow$_V$ | H | V |
|---|---|---|---|---|---|---|---|
| User Baseline | 0 | 63.85 | 64.10 | 0.29 | 0.12 | 1.000 | 1.000 |
| BO best | 3 | 68.84 | 69.32 | 0.43 | 0.30 | 0.922 | 1.011 |

TABLE II

Robot auto search: N4 CPU, 5% utilization improvement with overflow ≤ 1.2%

| Case | Iteration | Score | Utilization | Overflow$_H$ | Overflow$_V$ | H | V |
|---|---|---|---|---|---|---|---|
| User Baseline | 0 | 64.52 | 64.96 | 0.13 | 0.51 | 1.022 | 0.933 |
| BO best | 3 | 65.45 | 66.63 | 0.26 | 0.98 | 0.800 | 1.200 |
| BO best | 7 | 67.73 | 68.59 | 0.20 | 0.81 | 0.978 | 0.978 |
| BO best | 12 | 72.81 | 72.81 | 0.37 | 1.65 | 0.933 | 0.978 |

Thus, in some embodiments, a computer-implemented method for optimizing a physical layout of an integrated circuit (IC) includes (a) providing a set of values for an input variable parameter of the IC; (b) generating a set of layouts of the IC corresponding to the respective values for the set of input variable parameter; (c) computing a set of values for an output variable parameter corresponding to the set of input variable parameters based on the corresponding layout; (d) if a predetermined condition on is not met, determining at least one additional value for the input variable parameter based on the set of values for the input variable parameters and the values of the corresponding output variable parameters; and (e) repeating steps (b) through (d), with the additional value for the input variable parameter included in the set of input values.

In some embodiments, a system includes a processor and computer readable media accessible by the processor and storing instructions that when executed by the processor implement a method that includes (a) providing a set of values for an input variable parameter of the IC; (b) generating a set of layouts of the IC corresponding to the respective values for the set of input variable parameter; (c) computing a set of values for an output variable parameter corresponding to the set of input variable parameters based on the corresponding layout; (d) if a predetermined condition on is not met, determining at least one additional value for the input variable parameter based on the set of values for the input variable parameters and the values of the corresponding output variable parameters; and (e) repeating steps (b) through (d), with the additional value for the input variable parameter included in the set of input values.

In some embodiments, a method includes computing, using a first EDA tool and from a post-route layout of an electronic circuit, a first set of values for a performance parameter for the electronic circuit; computing a set of values for one or more electrical characteristics of the circuit by: (a) providing a set of input values of the one or more electrical characteristics, (b) computing, using a second EDA tool and the set of input values of the electrical characteristics, a second set of values of the performance parameter for the electronic circuit, (c) comparing the second set of values of the performance parameter with the first set of values of the performance parameter, and modifying the set of input values of the electrical characteristics by a Bayesian optimization process, and (d) repeating steps (b)

and (c) until the second set of values of the performance parameter bares a predetermined relationship with the first set of values of the performance parameter.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for optimizing a physical layout of an integrated circuit (IC) device, comprising:
   (a) providing a plurality of values for an input variable parameter of the IC device;
   (b) generating a plurality of layouts of the IC device corresponding to the respective values for the plurality of input variable parameter;
   (c) computing a plurality of values for an output variable parameter corresponding to the plurality of input variable parameters based on the corresponding layout;
   (d) determining at least one additional value for the input variable parameter based on the plurality of values for the input variable parameters and the values of the corresponding output variable parameters;
   (e) repeating steps (b) through (d), with the additional value for the input variable parameter included in the plurality of input values, until a predetermined condition is met; and
   (f) generating, using at least one of the at least one value determined in step (d) for the input variable parameter, a layout of the IC device.

2. The method of claim 1, wherein the determining at least one additional value for the input variable parameter comprises determining at least one additional value for the input variable parameter based on a combination of (a) proximity to the values for the an input variable parameter for which the computed output variable parameter is greater or smaller than the other computed output variable parameters and (b) uncertainty in the computed value for the output variable parameter at the value for the input variable parameter.

3. The method of claim 1, wherein step (f) comprises, when the predetermined condition is met,
   selecting the value for the input variable parameter for which the computed output variable parameter is greater or smaller than the other computed output variable parameters; and
   generating, using a placement-and-routing EDA tool and the selected value, a layout of the IC device.

4. The method of claim 3, further comprising fabricating an IC device based on the generated layout.

5. The method of claim 3, further comprising determining a limiting condition on the value of the output variable parameter, wherein the selecting the value for the input variable parameter comprises selecting the value for the input variable parameter for which the computed output variable parameter is greater or smaller than the other computed output variable parameters, subject to the limiting condition.

6. The method of claim 5, further comprising computing an overflow for the IC device, wherein:
the output variable parameter is utilization; and
the limiting condition is dependent on the computed overflow.

7. The method of claim 1, wherein the providing a plurality of values for an input variable parameter comprises computing the plurality of values for the input variable parameter based on another IC device of different size.

8. The method of claim 1, wherein the input variable parameter is size of a dimension of a voltage area (VA) in the IC device or size of a dimension of the IC device.

9. The method of claim 1, wherein the output variable parameter is utilization.

10. A system, comprising:
    a processor; and
    computer readable media accessible by the processor and storing instructions that when executed by the processor implement a method that includes
    (a) providing a plurality of values for an input variable parameter of the IC device;
    (b) generating a plurality of layouts of the IC device corresponding to the respective values for the plurality of input variable parameter;
    (c) computing a plurality of values for an output variable parameter corresponding to the plurality of input variable parameters based on the corresponding layout;
    (d) determining at least one additional value for the input variable parameter based on the plurality of values for the input variable parameters and the values of the corresponding output variable parameters;
    (e) repeating steps (b) through (d), with the additional value for the input variable parameter included in the plurality of input values until a predetermined condition on is met; and
    (f) generating, using at least one of the at least one value determined in step (d) for the input variable parameter, a layout of the IC device.

11. The system of claim 10, wherein step (f) of the method includes:
    when the predetermined condition is met, selecting the value for the input variable parameter for which the computed output variable parameter is greater or smaller than the other computed output variable parameters; and
    generating, using a placement-and-routing EDA tool and the selected value, a layout of the IC device.

12. The system of 11, wherein the method further comprises determining a limiting condition on the value of the output variable parameter, wherein the selecting the value for the input variable parameter comprises selecting the value for the input variable parameter for which the computed output variable parameter is greater or smaller than the other computed output variable parameters, subject to the limiting condition.

13. The method of claim 12, wherein:
    the method further comprises computing an overflow for the IC device, wherein:
    the output variable parameter is utilization; and
    the limiting condition is dependent on the computed overflow.

14. The system of claim 10, further comprising an IC manufacturing system configured to receive the layout generated by the processor and fabricate an IC device based on the generated layout.

15. The system of claim 10, wherein the input variable parameter is size of a dimension of a voltage area (VA) in the IC device or size of a dimension of the IC device.

16. The system of claim 15, wherein the output variable parameter is utilization.

17. The system of claim 10, wherein the determining at least one additional value for the input variable parameter comprises determining at least one additional value for the input variable parameter using a Bayesian optimization process.

18. A method, comprising:
computing, using a first EDA tool and from a post-route layout of an electronic circuit, a first set of values for a performance parameter for the electronic circuit; and
computing a set of values for one or more electrical characteristics of the circuit by:
   (a) providing a set of input values of the one or more electrical characteristics;
   (b) computing, using a second EDA tool and the set of input values of the electrical characteristics, a second set of values of the performance parameter for the electronic circuit;
   (c) comparing the second set of values of the performance parameter with the first set of values of the performance parameter, and modifying the set of input values of the electrical characteristics by a Bayesian optimization process;
   (d) repeating steps (b) and (c) until the second set of values of the performance parameter bares a predetermined relationship with the first set of values of the performance parameter; and
   (e) generating, using the set of modified input values of the electrical characteristics, a modified layout of electronic circuit.

19. The method of claim 18, wherein the one or more electrical characteristics comprise resistance and capacitance (RC values), and wherein the performance parameter is net delay.

20. The method of claim 19, the predetermined relationship is that a value measuring the difference between the second set of values of the performance parameter and the first set of values of the performance parameter is below a predetermined value, the method further comprising:
selecting the RC values when the value measuring the difference between the second set of values of the performance parameter and the first set of values of the performance parameter is below the predetermined value; and
using a logic synthesis EDA tool to generate a netlist at least partially based on the selected RC values.

* * * * *